(12) United States Patent
Zhou et al.

(10) Patent No.: US 8,770,917 B2
(45) Date of Patent: Jul. 8, 2014

(54) WIND POWER GENERATION SYSTEM WITH TURBOFANS

(71) Applicant: Beijing XiangTian Huachuang Aerodynamic Force Technology Research Institute Company Limited, Fangshan District (CN)

(72) Inventors: Dengrong Zhou, Hebei (CN); Jian Zhou, Hebei (CN)

(73) Assignee: Beijing Xiangtian Huachuang Aerodynamic Force Technology Research Institute Company Limited (CN)

( * ) Notice: Subject to any disclaimer, the term of this patent is extended or adjusted under 35 U.S.C. 154(b) by 0 days.

(21) Appl. No.: 13/938,334

(22) Filed: Jul. 10, 2013

(65) Prior Publication Data

US 2013/0330174 A1 Dec. 12, 2013

Related U.S. Application Data

(63) Continuation-in-part of application No. PCT/CN2012/072883, filed on Mar. 23, 2012.

(30) Foreign Application Priority Data

| Dec. 14, 2011 | (CN) | 2011 1 0416995 |
| Dec. 14, 2011 | (CN) | 2011 1 0417012 |
| Dec. 14, 2011 | (CN) | 2011 1 0417013 |
| Dec. 16, 2011 | (CN) | 2011 1 0420816 |
| Dec. 19, 2011 | (CN) | 2011 1 0426825 |

(51) Int. Cl.
*F03D 7/06* (2006.01)

(52) U.S. Cl.
USPC .............................. 415/4.2; 415/77; 415/909

(58) Field of Classification Search
CPC ............. F03D 1/00; F03D 1/02; F03D 1/025; F03D 1/04; F03D 1/0633; F03D 1/0691; F03D 3/005; F03D 3/02; F03D 3/04; F03D 3/0409; F03D 3/0427; Y02E 10/70; Y02E 10/721
USPC ................ 415/4.2, 4.4, 180, 909, 77; 290/55; 416/203
See application file for complete search history.

(56) References Cited

U.S. PATENT DOCUMENTS

| 581,311 A * | 4/1897 | Scovel et al. ................. 415/4.2 |
| 1,112,203 A * | 9/1914 | Fandrey ......................... 415/4.4 |

(Continued)

FOREIGN PATENT DOCUMENTS

| CN | 101016886 A | 8/2007 |
| CN | 201250763 Y | 6/2009 |

(Continued)

OTHER PUBLICATIONS

International Search Report issued Sep. 27, 2012 in corresponding International Application No. PCT/CN2012/072883.

*Primary Examiner* — Edward Look
*Assistant Examiner* — Aaron R Eastman
(74) *Attorney, Agent, or Firm* — Caesar, Rivise, Bernstein, Cohen & Pokotilow, Ltd.

(57) ABSTRACT

A wind power generation system with turbofans includes an air supply system, a composite structure with a turbofan, several generator components, a control device, and an air passage well. The air supply system is configured to rise the wind which enters into the wind power generation system, and further wind which is raised drives the composite structure with a turbofan to rotate; an operating gear ring connected to the composite structure with the turbofan rotates with it, and then the rotating turbofan drives a small gear in a generator component which engages with the operating gear ring to rotate with high speed. The generator begins to generate electricity when a required rotary speed of an electric generating set is achieved.

12 Claims, 9 Drawing Sheets

(56) References Cited

U.S. PATENT DOCUMENTS

| | | | |
|---|---|---|---|
| 1,600,105 A * | 9/1926 | Fonkiewicz | 415/142 |
| 3,936,652 A * | 2/1976 | Levine | 290/2 |
| 4,036,916 A * | 7/1977 | Agsten | 261/109 |
| 4,164,256 A * | 8/1979 | Kelp | 165/125 |
| 4,275,309 A * | 6/1981 | Lucier | 290/1 R |
| 4,935,639 A * | 6/1990 | Yeh | 290/55 |
| 5,381,048 A * | 1/1995 | Baird | 290/55 |
| 6,626,636 B2 * | 9/2003 | Bohn | 415/1 |
| 7,511,387 B2 * | 3/2009 | Fakhrai | 290/54 |
| 7,845,904 B2 * | 12/2010 | Rashidi | 416/60 |
| 7,918,650 B2 * | 4/2011 | Papp | 416/197 A |
| 7,956,487 B2 * | 6/2011 | Hovakimian | 290/55 |
| 8,128,337 B2 * | 3/2012 | Pezaris | 415/4.2 |
| 8,517,662 B2 * | 8/2013 | John | 415/1 |
| 2003/0156938 A1 * | 8/2003 | Verini | 415/4.2 |
| 2010/0034642 A1 * | 2/2010 | Evulet | 415/117 |

FOREIGN PATENT DOCUMENTS

| | | |
|---|---|---|
| CN | 101487449 A | 7/2009 |
| CN | 201288636 Y | 8/2009 |
| CN | 101526068 A | 9/2009 |
| CN | 101532466 A | 9/2009 |
| CN | 201507398 U | 6/2010 |
| CN | 201739089 U | 2/2011 |

* cited by examiner

WIND POWER GENERATION SYSTEM WITH TURBOFANS

CROSS-REFERENCE TO RELATED APPLICATIONS

This is a continuation-in-part of PCT/CN2012/072883, filed Mar. 23, 2012, and further claims the priority under 35 U.S.C. §119 to CN201110417012.0, filed Dec. 14, 2011, CN201110417013.5 filed Dec. 14, 2011, CN201110416995.6 filed Dec. 14, 2011, CN201110420816.6 filed Dec. 16, 2011, CN201110426825.6 filed Dec. 19, 2011.

TECHNOLOGY FIELD

This invention relates to a wind power generation system, and particularly relates to a wind power generation system with turbofans.

BACKGROUND

At present, vane wheel provided in small wind power equipments generally rotates vertically. Moreover, the vanes are directly connected to the axis of a power generator. Such arrangement results in a high requirement on start speed and rated speed. Ordinarily the power generator only can work over moderate breeze, which results in in sufficient utility of wind power and poor adaptability of the power generator. In addition, high speed causes large vibration and loud noise; the orientation mechanism varies frequently and vibrates more seriously when the wind direction is not stable.

Chinese patent document CN201250763Y disclosed a wind power generation equipment with steady rotate speed of engine, which provides an inertial flywheel to store energy and stabilize rotate speed. But such structure can not stabilize rotate speed well. When wind power changes dramatically, the ability of the flywheel to stabilize rotate speed is limited. Moreover, the flywheel itself occupies much space.

Chinese patent document CN201288636Y disclosed a kind of rotate speed detection and control device for small wind power generator, which provides a shaping circuit to control electric current and voltage of the generator.

Chinese patent document CN101526068A disclosed a wind power generation system with combined spiral vane wheel, which is axially assembled by some vane vertical members and each vane vertical member is assembled by some vane horizontal members along a radial direction of the spiral vane wheel, the spiral vane wheel is connected with some generating groups through a transmission mechanism, multiple generating groups outputting electric energy under a parallel connection mode. But in this invention, one spiral vane wheel is used to drive multiple low power generating groups, and the generating efficiency is low. Moreover, there is only one middle axis in the whole spiral vane wheel, which causes poor stability.

SUMMARY OF THE INVENTION

The purpose of the invention is to provide a wind power generation system, which can generate electricity even in gentle breeze through horizontal rotation of vane wheel with high efficiency.

The present invention is based on such a principle of operation. The natural wind is collected together and forms strong wind through high-pressure blower with strong force, and the formed strong wind vertically moves upward through a wind supply funnel. After coming out from an upper opening of the funnel, the strong wind directly blows a composite structure with a turbofan. Because an operating gear ring is welded on the upper surface of the composite structure with the turbofan, the operating gear ring rotates counterclockwise in horizontal direction of the composite structure with high speed. The operating gear ring engages with a small gear, when the operating gear ring rotates, it drives the small gear rotates clockwise in horizontal direction with high speed, such that the generator begins generating electricity when generator groups achieve requisite rotational speed. In addition, the generating equipment is provided in a stationary vane cylinder, which makes bottom wind moving upward in a spiral way into next generating equipment along the spiral of cylinder wall.

To achieve the above mentioned objects, the present invention utilizes the following technical features. First, utilizing design of the turbofan, the turbofan is assembled by some vanes which are spirally fixed on a wheel hub, the included angle between the vanes and horizontal plane is 75°. The turbofan is set in a stationary vane cylinder, and some spirally fixed vanes are fixed on the inner wall of said stationary vane cylinder and the included angle between the vanes and horizontal plane is 75°, so that wind can flow along an angle of the vanes and then form high speed thermal current which whirls upwards with an angle of 75° like a tornado. Second, traveling rail in the mounting structure of the turbofan ensures that the turbo fan can rotate due to wind, and simultaneously the turbofan has a certain centripetal angle to inner of traveling rail's center, which makes that the turbofan moves circularly on the traveling rail and will not move along straight line or other directions. Third, a big gear ring connected to the turbofan will rotate together with the turbofan, and then drives the small gear which engages with the big gear ring to rotate with high speed. The generator begins to generate electricity when the required rotary speed of the electric generating sets is achieved.

Basic technical solution for the present invention is a wind power generating system, and an operation structure thereof includes turbofans, mounting structure of the turbofans, electric generating sets and a control device. The turbofan engages with a small gear through a big gear ring, and the small gear is also provided with a cylindrical power distributor, transmission, high voltage electromagnetic auxiliary power unit and generator which are all mounted coaxially in turn. The generator begins to generate electricity when the operation speed of the small gear reaches the required rotary speed of the electric generating sets. When the operation speed of the small gear is low, the high voltage electromagnetic auxiliary power unit can provide auxiliary power for the generator to generate electricity.

In the above-mentioned technical solution, the structure of the turbofan includes inner vanes, outer vanes and a main body of the turbofan. The inner vanes are spirally and twistingly welded on the inner wall of the main body of the turbofan, and the outer vanes are spirally and twistingly welded on the outer wall of the main body of the turbofan, and the said inner vanes and outer vanes are set at an included angle of 75° from the horizontal plane. The twisting pattern aims to make equal delivery lift from vane tip to vane root so as to avoid loss of vortex. Because when the impeller is rotating, in order to obtain the same delivery lift, setting angles on each section plane of the vanes along radial direction are not equal because of different linear velocity along radial direction. The setting angle is smaller when it is closer to the outer margin, so the vanes appear as a twisting pattern. The present turbofans adequately makes use of wind power movement, and makes use of rotating speed increased vortex from center to outer margin which makes that flowing wind is automatically pumped into the vortex from center of vortex, then suction force is produced through center of vortex, which elevates the wind from blower and assists the generator to generate electricity.

Preferably, the said turbofan is wind power generation impeller. The turbofan of the present invention is not only applicable in environment with different wind directions but also applicable in environment with small wind force, and can transfer more wind power to mechanical energy further transfer to electric energy than other turbofans.

Preferably, the main body of the turbofan is a cylinder with certain thickness which makes inner and outer vanes easily welded.

Preferably, vanes are provided both inside and outside of the main body of the turbofan. The outer vanes collect wind which is from a blower in the interior of the turbofan, and inner vanes pump the collected wind upwards.

Preferably, vanes of the turbofan are twistingly fixed on the wall of the main body with spiral angle 2°-5°, and spirally rises overall.

Preferably, number of vanes of the turbofan is defined according to different gas feed rates which enter into the turbofan, and the inside and outside proportion is generally 1:2.

Preferably, the configurations of the inner said and outer vanes of the said turbofan are different, and there are opposite and interlaced distributions of the inner and outer vanes, which ensure that wind power can be accepted more efficiently.

Preferably, there are 9 inner vanes and 18 outer vanes in the turbofan. Because the configurations of the inner and outer vanes are different, there are opposite and interlaced distributions of the vane, which reduces loss of wind power and ensures more wind to be elevated upwards. The said number of vanes is the most preferred number of the present invention and we also can increase or reduce the number of vanes according to practical requirements. Number of inner vanes can be chosen as 6 or 7 or 9 or 10 etc, and number of outer vanes can be increased according to increment of inner vanes and can be reduced according to reduction of inner vanes.

Preferably, the vanes of the turbofan are rectangular after being unfolded. Of course, we do not exclude vanes with other shapes, for example:

Broadly obovate shape-leaf shape with approximate equality of length and width, and the widest position is near upper part of the vanes (such as magnolia).

Rotund shape-leaf shape with approximate equality of length and width, and the widest position is near the middle part of the vanes (such as lotus).

Broadly ovate shape-leaf shape with approximate equality of length and width, and the widest position is near the lower part of the vanes (such as Paliurus).

Obovate shape-leaf shape with an approximate length-width ratio of 1.5~2, and the widest position is near the upper part of the vanes (such Talinum paniculatum).

Ellipse shape-leaf shape with an approximate length-width ratio of 1.5~2, and the widest position is near the middle part of the vanes (such as Euonymus Japonicus Thunb).

Ovate shape-leaf shape with an approximate length-width ratio of 1.5~2, and the widest position is near the lower part of the vanes (such as Ligustrumlucidum).

Oblanceolar shape-leaf shape with an approximate length-width of ratio 3~4, and the widest position is near the upper part of the vanes (such as Gnaphalium multiceps).

Long ellipse shape-leaf shape with an approximate length-width ratio of 3~4, and the widest position is near the middle part of the vanes (such as Hypericum patulum).

Lanceolar shape-leaf shape with an approximate length-width ratio 3~4, and the widest position is near the lower part of the vanes (such as willow).

Linear shape-leaf shape with an approximate length-width ratio of higher than 5, and the widest position is near the middle part of the vanes (such as Ophiopogon japonicus).

Sword shape-leaf shape with an approximate length-width ratio of higher than 5, and the widest position is near the lower part of the vanes (such as grass-leaved sweetflag). As for the other shapes, there are triangle, halberd, arrow, heart, kidney, rhombic, spoon, scythe and deflection shapes etc.

Preferably, the vanes of the turbofan are distributed uniformly. The inner vanes are fixed uniformly on the inner wall of the main body, and the outer vanes are fixed uniformly on the outer wall of the main body.

Preferably, the inner vanes and outer vanes of the turbofan are set at an included angle of 75°~80° from horizontal plane. When the turbofan is rotating, wind from the blower is formed as thermal current which whirls upwards like a tornado and is elevated upwards quickly.

In the above mentioned solution, said mounting structure of the turbofan includes a traveling rail, a turbofan, a seal groove for grease, a big gear ring, wherein the turbofan is supported by dowel pins on the traveling rail, the seal groove for grease is mounted on upper plane of the turbofan, and the seal groove for grease is connected to a big gear ring through a bolt group. The orbit includes the traveling rail, dowel pins and roller wheel brackets. The traveling rail is composed of the outer convex surface of traveling rail, the inner concave surface of the traveling rail the upper concave surface of the traveling rail, the upper support of the traveling rail and the lower support of the traveling rail. The said turbofan is composed of a main body of turbofan, inner vanes and outer vanes.

Preferably, the said traveling rail is a round orbit which consists of three staged arc-shaped orbits. The traveling rail is divided into three staged orbits which makes it easy consign and mount, as well as making it simple and convenient to lock the roller wheel bracket with a roller wheel on the traveling rail. After each arc-shaped traveling rail is made staged type, three staged orbits are connected with several screw bolt groups and forming a whole round orbit, so that it is simply assembled and meets the requirement of power operation.

Preferably, the said turbofan is supported by dowel pins on the traveling rail, and the upper surface of the dowel pin is a circular plane.

Preferably, there is a roller wheel in the said traveling rail. The roller wheel is a taper cylinder roller wheel. A roller shaft is provided in the middle of the taper roller wheel, the roller shaft is mounted in round apertures on side face and then the taper cylinder roller wheel is mounted on a roller wheel bracket.

Preferably, the said traveling rail is provided with an upper concave surface of the orbit, taper raised face of the taper cylinder roller wheel is in contact with upper concave surface of the orbit, which ensures that taper cylinder roller wheel to make centripetal circular movement.

Preferably, the inner and outer surfaces of the traveling rail are all concave surfaces, and the inner convex surface of the roller wheel is an arc surface and the center of which is concentric with the center of the traveling rail, and the inner concave surface of the roller wheel bracket is locked on the convex surface, so neither will the turbofan deviate from orbit when rotating nor will it move upward with wind when wind power is very strong, and the roller wheel has a certain centripetal angle to the interior of orbit's center, which ensures the roller wheel to make a circular movement along the orbit but not go straight line or other directions.

Preferably, the said seal groove for grease is connected to the upper surface of the turbofan through the screw bolt groups. The seal groove for grease is connected with the big gear ring through the screw bolt groups and grease is poured into the seal groove for grease, so it can realize function of lubrication and rust prevention when the turbofan is operated.

In the above mentioned technical solutions, the said composite structures of the turbofan are all placed in the air passage well.

Preferably, the said air passage well is composed of a cylinder wall, outer wall passage of the air passage well and stationary vanes. The said stationary vanes appear spiral type on the inner wall of the cylinder wall, and relating to the inner wall of the cylinder wall, the vanes are set with an included angle of 75° from horizontal plane.

In the above mentioned technical solutions, there are several electric assemblies, and each electric assembly is composed of a small gear, a gear shaft bearing, a multiple column power distributor, a transmission, a high voltage electromagnetic auxiliary power unit and a permanent magnet generator. The small gear is fixedly connected with the gear shaft bearing, the small gear externally engaging with the big gear ring. In addition, the column power distributor, the transmission, the high voltage electromagnetic auxiliary power unit and the generator are coaxially mounted in turn with the small shaft.

In the above mentioned technical solutions, functions of each part in the said electric assembly are: producing torsion when the small gear shaft rotates with the gear, the column power distributor can reduce torsion so as to avoid wrenching the shaft. The transmission can automatically adjust velocity under different wind power which ensures that the generator can generate electricity stably, the high voltage electromagnetic auxiliary power unit mounted on the rotating shaft can realize function of power assist when wind power is weak.

In the above mentioned technical solutions, the electric assembly and control device are mounted on the fixed bracket of the inner wall of stationary vanes. The control device is composed of a starter and an electromagnetic brake. The electromagnetic brake is mounted on the inner wall of the big gear ring, and is opened when the turbofan needs to be stopped. Magnetic force produced by the electromagnetic brake attracts the big gear ring to realize function of braking. The starter is mounted on the shaft of the small gear, and it helps the turbofan to start when rotation of the small gear drives the big gear ring.

BRIEF DESCRIPTION OF DRAWINGS

Embodiments of the present invention will be described in detail referring to the drawings, wherein:

FIG. 3-1 is a top view of the wind supply funnel;

FIG. 4-1 is a top view of structure of one preferred embodiment of FIG. 1;

FIG. 4-2 is a side view of structure of one preferred embodiment of FIG. 1;

FIG. 5-1 is a side view of the composite structure with turbofan of FIG. 1;

FIG. 7-1 is a top view of traveling rail;

FIG. 8-1 is an exploded view of the stationary vanes.

Component lists: concrete wall 010, wind supply funnel 020, high pressure blower 021, wind supply duct 022, funnel 023, composite structure with turbofan 030, concrete base platform 100, fixing bolt 200, traveling rail 300, turbofan 400, operating gear ring 500, seal groove for grease 600, electromagnetic brake 700, gear shaft bearing 800, small gear 900, multiple column power distributor 110, transmission 120, high voltage electromagnetic auxiliary power unit 130, permanent magnetic generator 140, fixed bracket 150, stationary vane cylinder 160, starter 170, inverted rod brake 180, big bearing 190, central shaft 210, inner convex surface of the roller wheel bracket 301, roller wheel bracket 302, dowel pin 303, taper cylinder roller wheel 304, roller wheel shaft 305, roller wheel 306, inner concave surface of the traveling rail 307, upper concave surface of the traveling rail 308, upper support of the traveling rail 309, outer convex surface of the traveling rail 310, lower support of the traveling rail 311, operating orbit 312, outer vanes 401, main body of turbofan 402, inner vanes 403, inner wall of main body 404, outer wall of main body 405, upper plane of main body 406, lower plane of main body 407.

DETAILED EMBODIMENTS

Embodiments of the present invention are described with reference to the figures as following.

Figure 1:
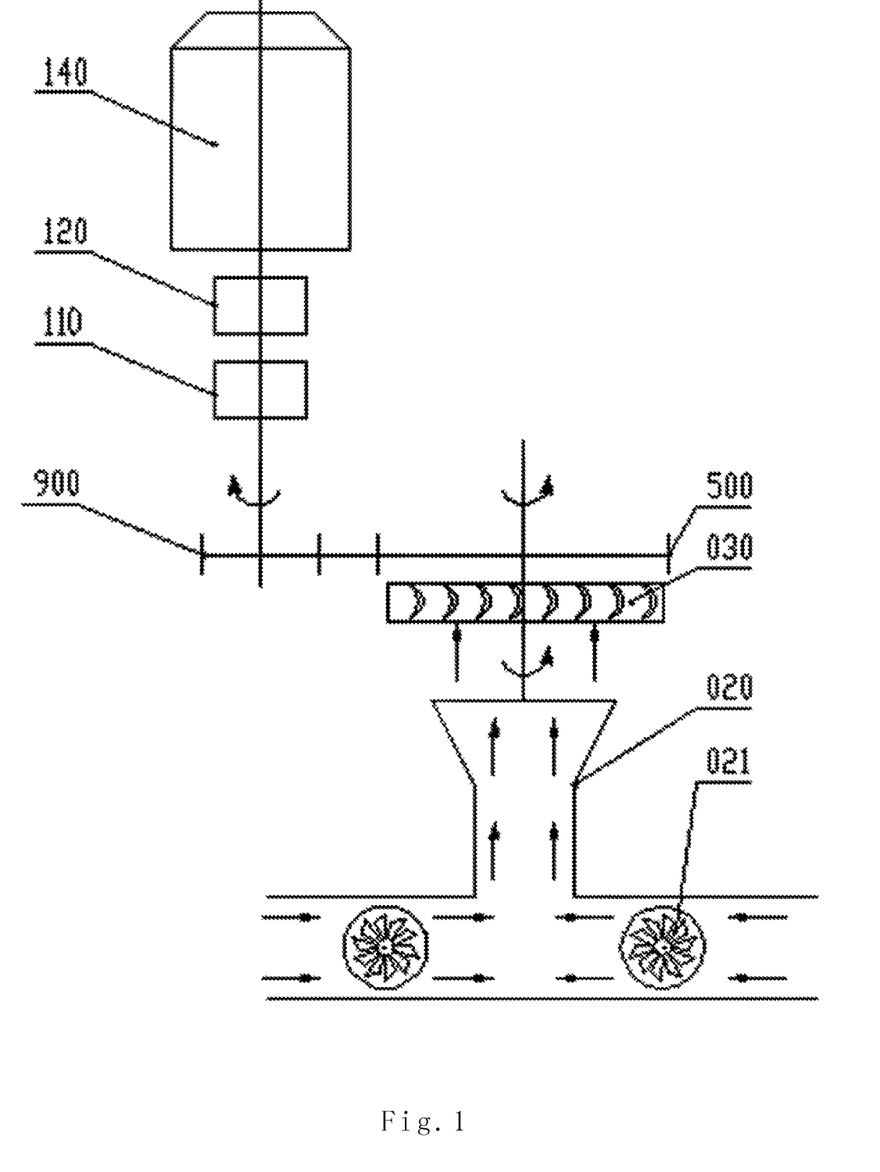
FIG. 1 is a schematic view of structure operation of one preferred embodiment according to each layer structure of wind power generation system with turbofans of this invention.
Figure 2:
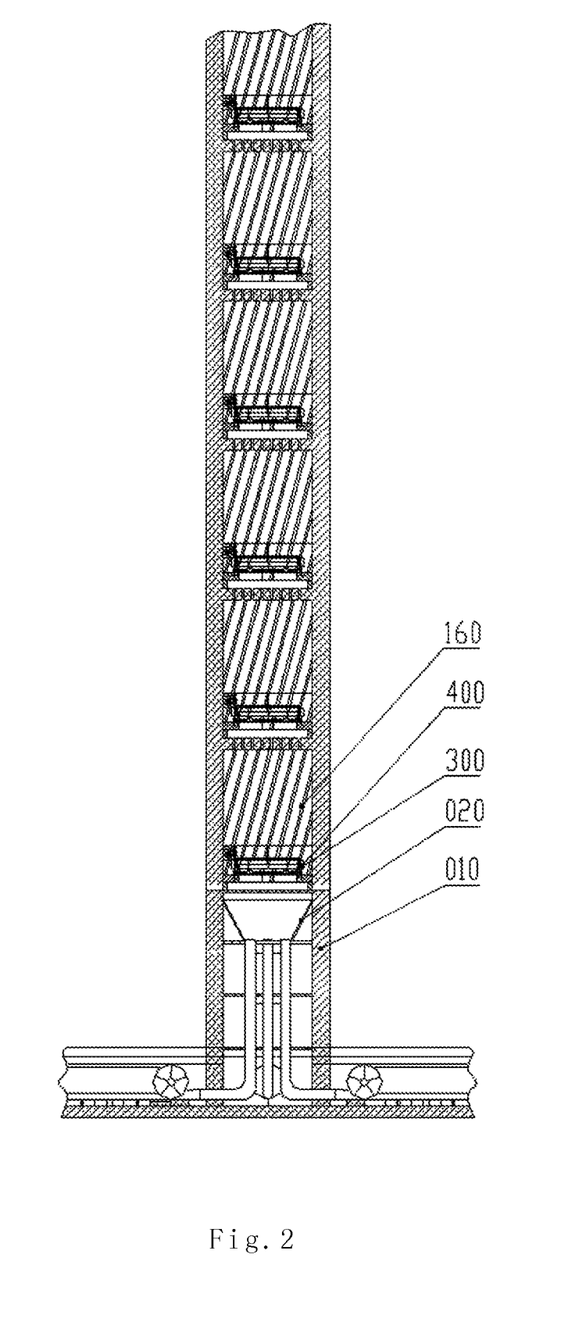
FIG. 2 is a structure schematic view of one preferred embodiment according to wind power generation system with turbofans of this invention.
Figure 3:
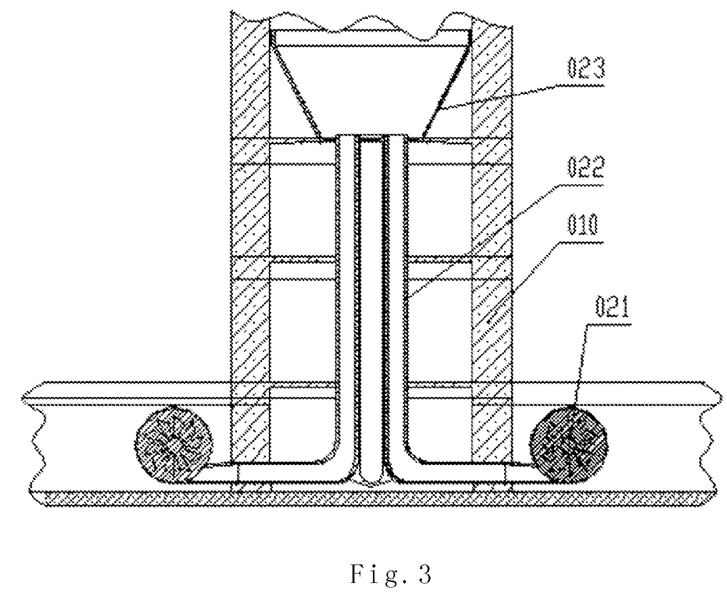
FIG. 3 is a sectional view of the wind supply funnel.

Embodiment 1:

The present embodiment is a wind power generation system with turbofans, and the operation of each layer structure is shown as FIG. 1.

Natural wind is collected together and forms strong wind through high-pressure strong blower 021. The formed strong wind vertically moves upward through a wind supply funnel 020, and the strong wind directly blows the composite structure with turbofan 030 after coming out from upper opening of the funnel 023. Because the operating gear ring 500 is welded on the upper surface of the composite structure with turbofan 030, the operating gear ring 500 rotates counterclockwise in horizontal direction of the composite structure 030 with high speed. The operating gear ring 500 engages with small gear 900, and it drives the small gear 900 rotates clockwise in horizontal direction with high speed when the operating gear ring 500 rotates. The composite structure with turbofan 030 includes concrete base table 100, fixing bolt 200, traveling rail 300, turbofan 400, starter 170, sea; groove for grease 600, electromagnetic brake 700. In addition, the straight line arrow indicates the moving direction of the wind, and the arc arrow indicates the rotary direction of the structure in horizontal direction.

Overall mounting structure of the present invention is shown as FIGS. 2, 3, 3-1, and 4A. The wind supply funnel 020 is composed of funnel 023 and wind supply duct 022. The big opening of the funnel 023 is upward and the small opening is downward. The big opening of the funnel 023 contacts with the bottom of the concrete base platform 100. The lower end of the funnel 023 is connected to four wind supply ducts 022 with bending angle of 90 degrees so as to promote the wind from the bottom end to straightly rise along the inner wall of the duct, and the wind supply duct 022 is welded by the steel plate tube with thickness of 10 mm. Because the natural wind is dispersed, a high pressure strong blower 021 is mounted at a horizontal port of each wind supply duct 022, so the high pressure strong blower 021 collects the natural wind together, and formed strong wind is transported into the stationary vane cylinder 160 through wind supply duct 020. The vanes in stationary vane cylinder are twistingly fixed on the wall of the main body with spiral angle 2°-5°, and these vanes are spirally and twistingly fixed on the inner wall of the stationary vane cylinder 160 with an included angle of 75° from horizontal plane, which makes the wind spirally rise overall like a tornado.

Figure 4A:
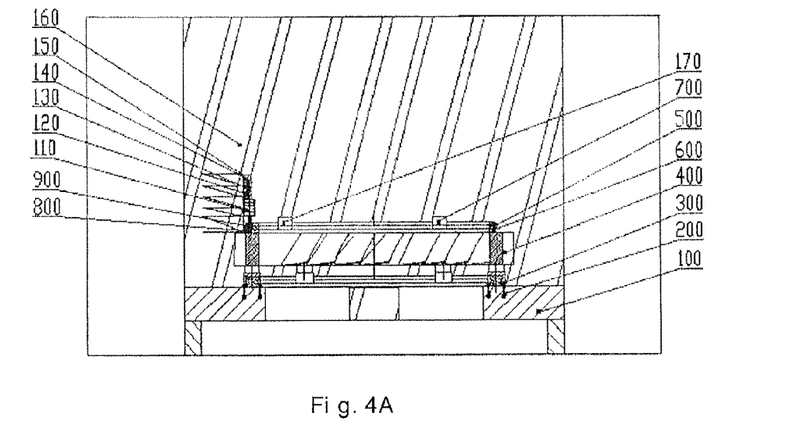
FIG. 4A is a schematic view of one preferred embodiment according to wind power generation structure of this invention.
Figure 4B:
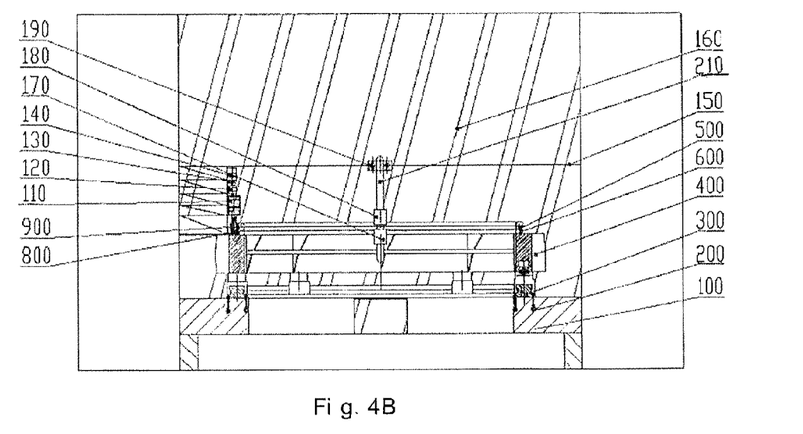
FIG. 4B is a schematic view of a second embodiment according to wind power generation structure of this invention.
Figure 41:
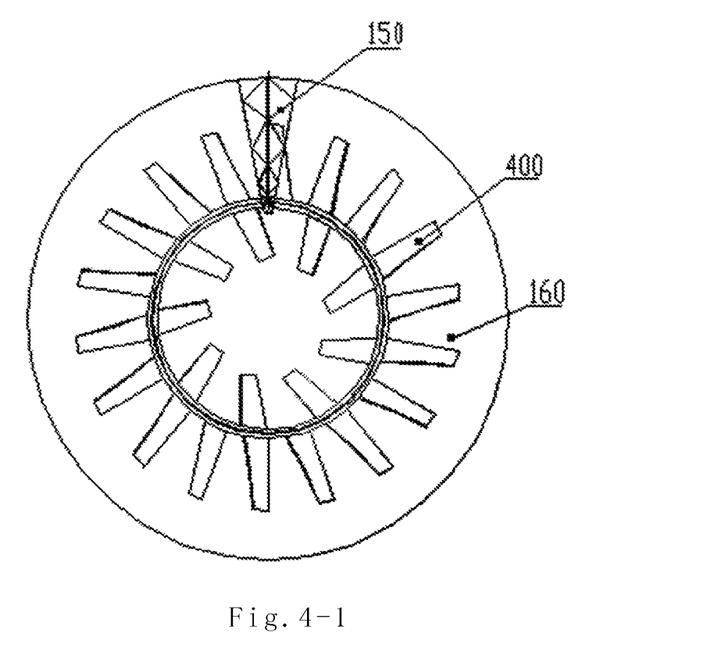
Figure 42:
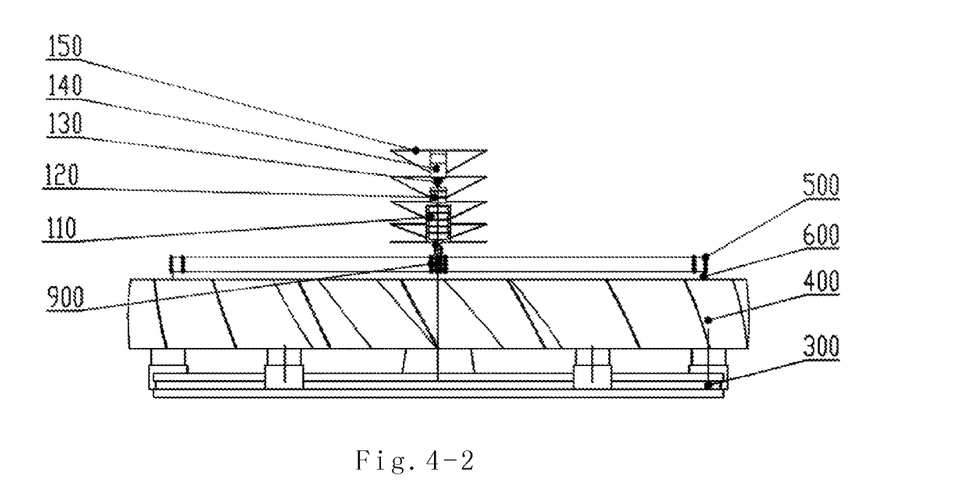

As shown in FIG. 4-1 and FIG. 4-2, electric assembly and the control device are mounted on the fixed bracket of the inner wall of the stationary vane cylinder 160, and there is a 200 mm gap between the stationary vane cylinder 160 and turbofan 400, which ensures that more wind from the stationary vane cylinder 160 can be raised to next group of generating device with turbofan. As shown in FIG. 4B, the electric assembly is composed of a multiple-column power distributor (110), a transmission (120), an electric generator (140) and a high voltage electromagnetic auxiliary power unit (130)

The control device is composed of a starter and an electromagnetic brake. The electromagnetic brake is mounted on the inner wall of the operating gear ring 500. When the turbofan needs to be stopped, it stops supplying wind to the strong blower. The turbofan 400 can not stop immediately because of inertia, and now the electromagnetic brake 700 is opened. Because the electromagnetic brake 700 is composed of two iron cores and electric current flows into each iron core with same coil and in the same direction. Based on Ampere's rule, magnetic force is produced when power is turned on, and the two iron cores move closer to the center which makes the gear ring locked between two irons, thus it will produce great friction force between the two iron cores when the gear ring is rotating. As such, function of brake can be achieved. The starter is mounted on shaft of small gear, and it helps the turbofan 400 to start when rotation of the small gear 900 drives the operating gear ring 500.

Figure 8:
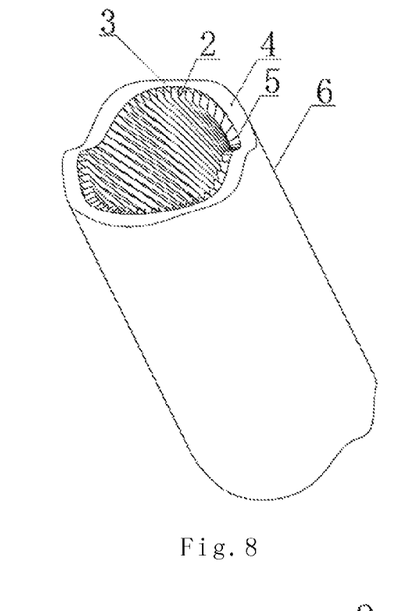
FIG. 8 is a block view of the stationary vanes.
Figure 31:
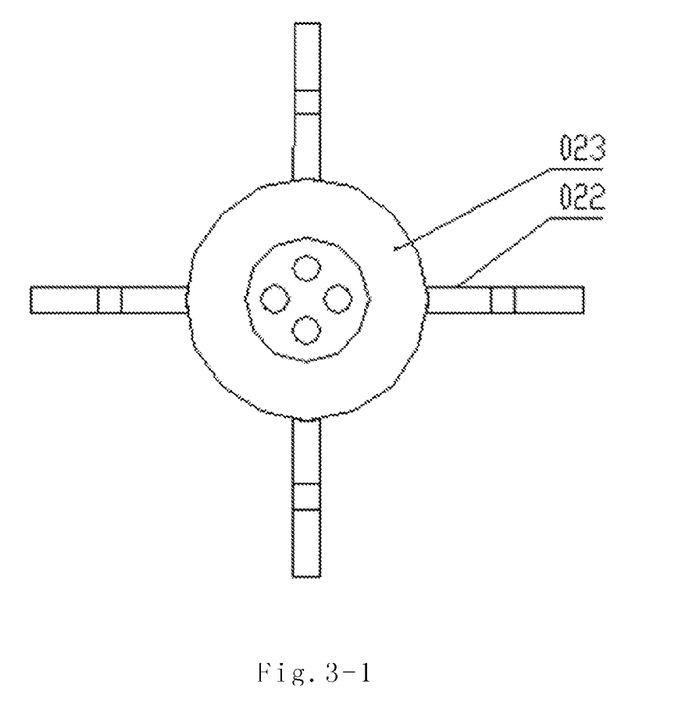
Figure 81:
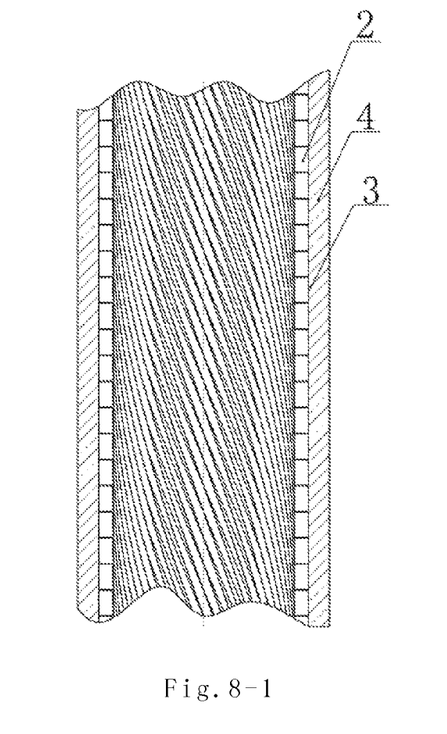

Then with reference to FIG. 8 and FIG. 8-1, overall mounting structure of present invention is set in air passage well as shown in FIG. 8. The air passage well is composed of stationary vanes 2, traveling rail 300, wall of vane cylinder 4, outer wall passage of air passage well 7, inner wall of air passage well 9, outer wall of air passage well 10, outer wall of cylinder 6, inner wall of cylinder 5. Traveling rail 3 is formed between stationary vane 2 and another stationary vane 2. Inner wall of air passage well 9 is fixedly connected to outer wall cylinder 6 through outer wall passage of air passage well 7, and outer wall passage of air passage well 7 is set around inner wall of air passage well 10.

Further with reference to FIG. 8-1, stationary vanes 2 on the inner wall of cylinder 5 are set at an included angle of 75° from horizontal direction of inner wall of cylinder 5.Because the included angle between the stationary vanes and horizontal plane is same with that between the inner and outer vanes of turbofan and horizontal plane, as well with the same direction, wind can be rapidly and spirally raised when passing through the wall of the vane cylinder under the action of spiral traveling rail 300 and spiral stationary vanes.

Figure 5:
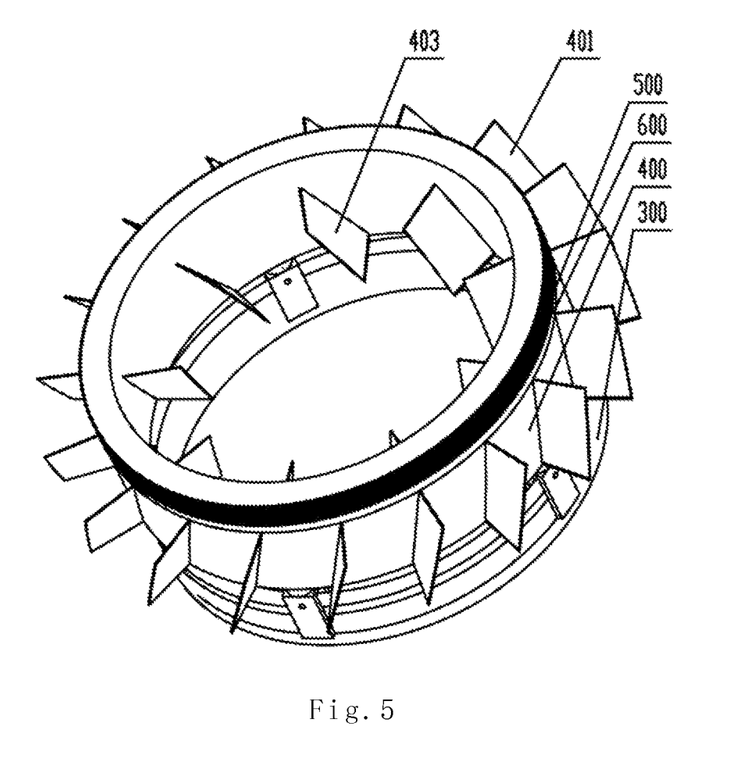
FIG. 5 is a block view of the composite structure with turbofan of FIG. 1.
Figure 6:
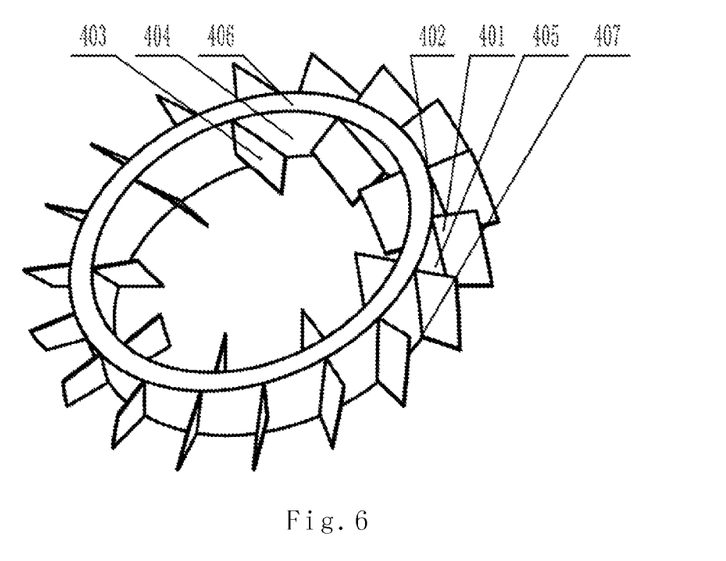
FIG. 6 is a block view of the turbofan.

The structure of turbofan in this embodiment is shown as FIG. 5 and FIG. 6. The turbofan 400 is composed of outer vanes 401, main body 402 and inner vanes 403. The main body includes inner wall of main body 404, outer wall of main body 405, upper plane of main body 406 and lower plane of main body 407. Eighteen outer vanes 401 are obliquely and fixedly connected to the outer wall of main body 405 through welding. A certain angle is set between the outer vanes and vertical wall of outer wall of main body 405 such as 15 degree, 20degree or 25 degree etc. The end which is opposite to one end of the vane outer wall 405 that connects to the outer vanes 401 does not exceed upper plane of the main body 406 and lower plane of the main body 407 in the horizontal direction. Nine inner vanes 403 are obliquely and fixedly connected to the inner wall of main body 404 through welding, and a certain angle is set between the inner vanes and vertical wall of inner wall 404 such as 15 degree, 20 degree or 25 degree etc. As well, the end which is opposite to one end of the vane inner wall 404 that connects to the inner vanes 403 does not exceed upper plane of main body 406 and lower plane of main body 407 in the horizontal direction. Advantage of such inclined configuration of inner vanes 401 and outer vanes 402 is that the configuration direction of the vanes is generally same with direction of the wind which flows through the vanes, so it is easy to reduce loss of wind power so as to increase efficiency of turbofan vanes.

The outer vanes 401 and inner vanes 402 of the present invention are welded on outer wall of main body 405 and inner wall of main body 404 with a spiral twisting angle of 2°-5°. When the turbofan rotates, wind which is supplied by wind blower is transformed to thermal current which rises spirally like tornado, and the wind rapidly rises to the upper sky.

Vanes of the turbofan are uniformly distributed on the inner wall of main body 404 and the outer wall of main body 405 with an inside and outside proportion of 1:2. Preferably in the present invention, there are nine vanes inside and eighteen vanes outside. Because the configurations of inner and outer vanes of the turbofan are different, there are opposite and interlaced distributions of inner and outer vanes such that it can reduce loss of wind power and ensures wind power can be accepted more efficiently. Number of vanes is the most preferred number of the present invention. We can also increase or reduce number of vanes according to practical requirement. Number of inner vanes can be chosen as 6 or 7 or 9 or 10 etc, and number of outer vanes can be increased according to increment of inner vanes and can be reduced according to reduction of inner vanes. The vanes of the turbofan are rectangular after unfolded. Of course, we do not exclude vanes with other shapes.

Figure 7:
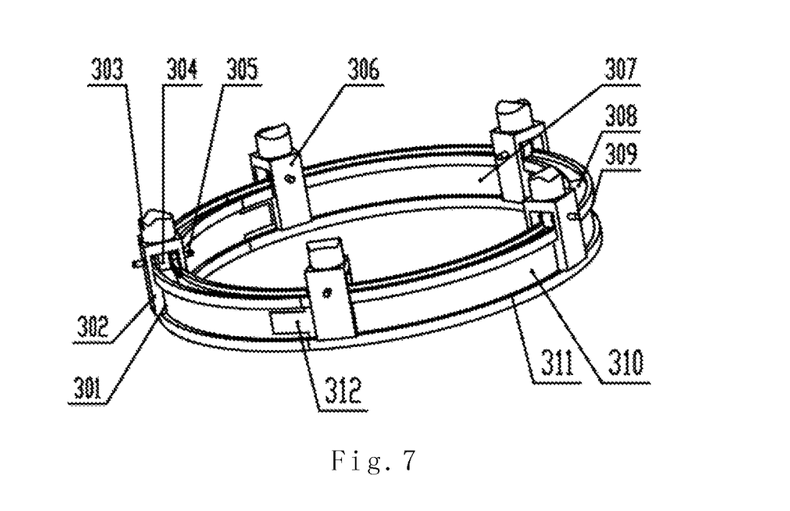
FIG. 7 is a block view of traveling rail.

Mounting structure of turbofan adopted by this embodiment is as shown in FIG. 5, FIG. 5-1, FIG. 7 and FIG. 7-1. The mounting structure of turbofan includes an traveling rail 300, a turbofan 400, a seal groove for grease 600, and an operating gear ring 500. The turbofan 400 is supported by dowel pin 303 on the traveling rail 300, the dowel pin 303 being set on a roller wheel bracket 302, the seal grove for grease 600 being fixedly mounted on upper plane of the turbofan 400 through some screw bolt groups. Upper plane of seal groove for grease 600 is fixedly connected to the operating gear ring through some screw bolt groups. With the connection of bolt groups, turbofan 400, seal groove for grease 600 and operating gear ring are connected as a whole part. When the turbofan rotates, seal groove for grease 600 and the operating gear ring 500 will also rotate, such that phenomenon of offset and relative dislocation will not occur.

Figure 51:
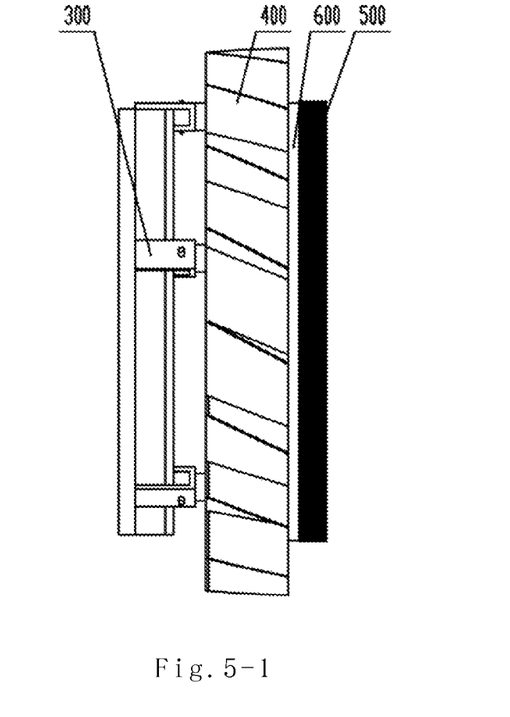

The seal groove for grease 600 is connected to the upper surface of the turbofan 400 through screw bolt group. The seal groove for grease 600 is connected with the operating gear ring 500 through screw bolt groups and grease is poured into the seal groove for grease 600, which can realize function of lubrication and rust prevention when the turbofan 400 is operating.

Figure 71:
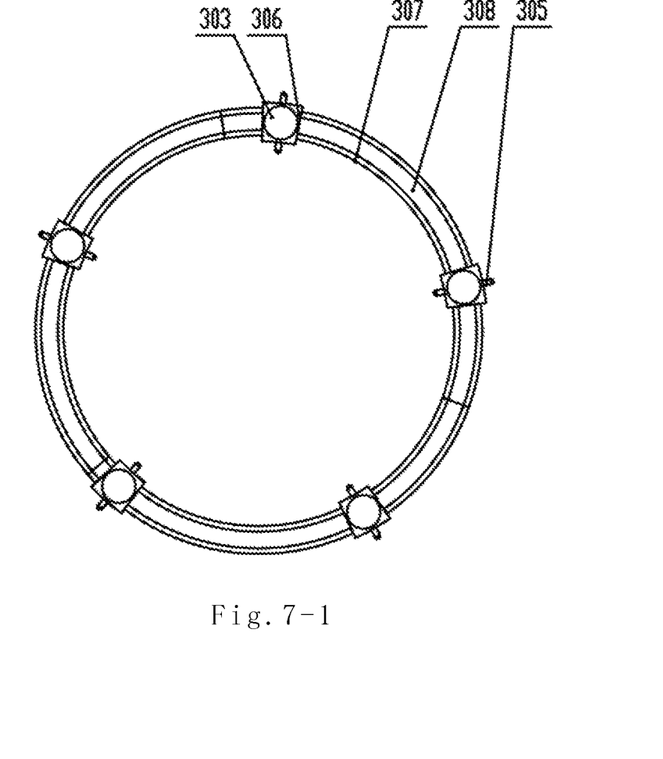

As shown in FIG. 7 and FIG. 7-1, the traveling rail 300 includes an orbit 312, dowel pins 303 and roller wheel brackets 302. The orbit 312 is composed of outer convex surface of the traveling rail 310, inner concave surface of the traveling rail 307, upper concave surface of the traveling rail 307, upper support of the traveling rail 309 and lower support of the traveling rail 311.

The orbit 312 is a round orbit which consists of three staged arc-shaped orbits. The staged orbit means that the orbit 312 has three segments, and each segment has two fractures at its end. One fracture appears form like concave and another appears form like protruding, and head and tail of adjacent two segments can be connected as an arc surface. Such three staged configuration aims to be easy when consigned and mounted. At the same time, it makes simple and convenient to lock the roller wheel bracket 302 which is mounted with a roller wheel on the orbit 312. After each arc-shaped orbit is made staged type, three staged orbits are connected with several screw bolt groups and form whole round orbit, so that it is simply assembled and meets the requirement of power operation.

The upper surface of the dowel pin 303 is a round plane, and it contacts with the lower plane of turbofan 400. The lower surface of the dowel pin 303 is a smooth round plane, and the plane locates on the upper plane of roller wheel bracket 302, and the upper plane of roller wheel bracket 302 is larger than the bottom of the dowel pin 303 such that the roller wheel component can be easily mounted.

The roller wheel 306 which is provided with roller wheel shaft 305 passes through a small hole on side board of the roller wheel bracket 302, and the roller wheel 306 is provided in the roller wheel bracket 302, and cylindrical surface of the taper cylinder roller wheel 304 of roller wheel 306 is in contact with upper concave surface of the orbit 308. The roller wheel has a certain centripetal angle to the interior of orbit's center, which ensures the roller wheel 306 to make circular movement along the orbit 312 when the turbofan 400 rotates.

The inner side of the roller wheel bracket 302 is locked on the outer convex surface of the orbit 310 and the inner concave surface of the orbit 307. The lower plane of the roller wheel bracket 302 abuts against the lower support of the orbit 311, and the inner projecting plane of the roller wheel bracket 302 abuts against the upper support of the orbit 309. As such, neither will the turbofan 400 deviate from orbit 312 when rotating, nor will it move upward with wind when wind power is very strong. The roller wheel 306 has a certain centripetal angle to the interior of orbit 312's center, which ensures the roller wheel 306 makes circular movement along the orbit 312 and not go in straight or other directions.

Numbers of dowel pin 303, roller wheel bracket 302, roller wheel shaft 305, and tapered cylinder roller wheel 304 are five in the embodiment. According to the principle that three points define a plane, numbers of above components can be chosen as three or four or six or seven etc. We can increase or reduce numbers of dowel pin 303, roller wheel bracket 302, roller wheel shaft 305, and tapered cylinder roller wheel 304 according to actual size of the mounting structure. Assemblies of dowel pin 303, roller wheel bracket 302, roller wheel shaft 305, and tapered cylinder roller wheel 304 are uniformly distributed on the orbit 312.

Embodiment 2:

The structure, mounting structure and component of electric machine in this embodiment are same as those in embodiment 1.

The construction of this embodiment is shown as FIG. 4B. A steel frame is welded on the inner wall of the turbofan 400, a central shaft 210 is connected to the center of the steel frame, a starter and a guide rod brake 180 is mounted on the central shaft 210. Inertia of the turbofan 400 is great because of its large mass, and the turbofan 400 begins to rotate slowly from stationary state when it is driven by wind power. So a starter is provided to help the turbofan to start so as to make the turbofan 400 enter into operational state with high speed. When the system goes wrong and needs maintenance, the turbofan should be stopped immediately, and so the guide rod brake is opened to make the turbofan 400 stop rotating.

The invention claimed is:

1. A wind power generation system, comprising:
   an air supply system;
   a composite structure with a turbofan;
   a plurality of generator components;
   a control device; and
   an air passage well,
   wherein the air supply system is configured to rise a flow of wind which enters into the wind power generation system;
   a wind supply funnel in the air supply system is set in a bottom of the composite structure with the turbofan;
   the composite structure with the turbofan is set in an interior of the air passage well;
   the flow of wind which is raised drives the composite structure with the turbofan to rotate;
   an operating gear ring connected to the composite structure with the turbofan rotates with it, and then drives a small gear in a generator component which engages with the operating gear ring to rotate with high speed; and
   a generator begins to generate electricity when a required rotary speed of an electric generating set is achieved, and
   wherein the composite structure with the turbofan includes a traveling rail, a turbofan, a seal groove for grease, a starter, and an electromagnetic brake, and
   wherein the turbofan is assembled by a plurality of vanes which are spirally fixed on an inner wall and an outer wall of a main body, an included angle between the vanes and a horizontal plane is 75°, and the vanes on the inner and outer walls are mounted on the inner wall and the outer wall of the main body oppositely and interlacedly with a proportion of 1:2.

2. The wind power generation system according to claim 1, wherein the composite structure with the turbofan is set to rotate counterclockwise in a horizontal direction.

3. The wind power generation system according to claim 1, wherein the starter and the electromagnetic brake are mounted on an inner wall of the operating gear ring.

4. The wind power generation system according to claim 3, wherein the operating gear ring rotates counterclockwise in a horizontal direction.

5. The wind power generation system according to claim 1, wherein the small gear rotates clockwise in a horizontal direction.

6. The wind power generation system according to claim 1, wherein said wind supply funnel comprises a funnel and at least one wind supply duct.

7. The wind power generation system according to claim 6, wherein
- a big opening of the funnel is upward and a small opening of the funnel is downward;
- the big opening of the funnel contacts with a bottom of a concrete base table;
- a lower end of the funnel is connected to four wind supply ducts with a bending angle of 90 degrees, and each wind supply duct is welded by a steel plate tube with a thickness of 10 mm; and
- a high pressure strong blower is mounted at a horizontal port of each wind supply duct.

8. The wind power generation system according to claim 7, wherein
- a mounting structure of the turbofan comprises the traveling rail, the seal groove for grease, and the operating gear ring; and
- the traveling rail is composed of an orbit, a plurality of dowel pins, and a plurality of roller wheel brackets.

9. The wind power generation system according to claim 8, wherein five dowel pins and five roller wheel brackets are uniformly distributed on the orbit, and each dowel pin is welded on an upper plane of each of one of the roller wheel brackets; and
- an inner side surface of each roller wheel bracket is locked on an inner concave surface and an outer convex surface of the traveling rail, and a roller wheel is mounted in an interior of each roller wheel bracket.

10. The wind power generation system according to claim 8, wherein an air passage well comprises a cylinder wall, an outer wall passage of the air passage well, and at least one stationary vane.

11. The wind power generation system according to claim 10, wherein the stationary vane appears in spiral form on an inner wall of the cylinder wall, and is set with an included angle of 75° in a horizontal direction from the inner wall of the cylinder wall.

12. The wind power generation system according to claim 1, wherein each component of an electric machine comprises a multiple-column power distributor, a transmission, a permanent magnet generator, and a high voltage electromagnetic auxiliary power unit; and
- the control device comprises a starter and an electromagnetic brake.

* * * * *